United States Patent
Beznoska (10) Patent No.: US 10,914,321 B2
(45) Date of Patent: Feb. 9, 2021

(54) FAN BLADE WITH REPLACEABLE MICROPARTICLE FILTER ELEMENT

(71) Applicant: William Beznoska, Atwater, CA (US)

(72) Inventor: William Beznoska, Atwater, CA (US)

( * ) Notice: Subject to any disclaimer, the term of this patent is extended or adjusted under 35 U.S.C. 154(b) by 67 days.

(21) Appl. No.: 16/014,927

(22) Filed: Jun. 21, 2018

(65) Prior Publication Data
US 2019/0003492 A1 Jan. 3, 2019

Related U.S. Application Data

(60) Provisional application No. 62/526,155, filed on Jun. 28, 2017.

(51) Int. Cl.
| | | |
|---|---|---|
| F04D 29/70 | (2006.01) | |
| F04D 29/38 | (2006.01) | |
| B01D 46/00 | (2006.01) | |
| F04D 25/08 | (2006.01) | |

(52) U.S. Cl.
CPC ....... *F04D 29/703* (2013.01); *B01D 46/0005* (2013.01); *B01D 46/0056* (2013.01); *F04D 25/088* (2013.01); *F04D 29/384* (2013.01); *F04D 29/388* (2013.01); *B01D 2279/35* (2013.01)

(58) Field of Classification Search
CPC ...... F04D 25/088; F04D 29/324; F04D 29/38; F04D 29/384; F04D 29/388; F04D 29/703; B01D 46/0005; B01D 46/0056
See application file for complete search history.

(56) References Cited

U.S. PATENT DOCUMENTS

| | | | | |
|---|---|---|---|---|
| 5,341,565 A | * | 8/1994 | Kuryliw | F04D 29/388 29/889.72 |
| 6,733,239 B2 | * | 5/2004 | Lee | F04D 29/388 416/224 |
| 6,994,522 B1 | * | 2/2006 | Chin-Chih | F04D 29/388 416/146 R |
| 2006/0110257 A1 | * | 5/2006 | Huang | F04D 29/384 416/235 |
| 2006/0177307 A1 | * | 8/2006 | Owens | A61L 9/048 416/5 |
| 2007/0122286 A1 | * | 5/2007 | Leung | F04D 29/384 416/210 R |
| 2018/0080468 A1 | * | 3/2018 | Kim | F04D 29/384 |

* cited by examiner

*Primary Examiner* — Courtney D Heinle
*Assistant Examiner* — Sang K Kim (57) ABSTRACT

An air filtering device with a replaceable microparticle filter element consists of a rotating blade member, an air filtering panel, a first set of vortex generators, a second set of vortex generators, a receiving channel, and a positioning aperture. The air filtering panel is secured in the positioning aperture that traverses through the rotating blade member. The rotating blade member consists of a fixed end, a free end, a structural body, a top surface, a bottom surface, a leading edge, and a trailing edge. The structural body extends in between the fixed end, the free end, the leading edge, and the trailing edge. Both the first and second set of vortex generators are mounted onto the top surface and along the leading edge for filtering efficiency purposes.

1 Claim, 11 Drawing Sheets

FAN BLADE WITH REPLACEABLE MICROPARTICLE FILTER ELEMENT

The current application claims a priority to the U.S. Provisional Patent application Ser. No. 62/526,155 filed on Jun. 28, 2017.

FIELD OF THE INVENTION

The present invention relates generally to a fan blade with filtering properties. More specifically, the present invention is a fan blade with a replaceable microparticle filter element.

BACKGROUND OF THE INVENTION

Air filters are commonly used with heating, ventilation, and air conditioning (HVAC) systems in the air intakes to remove solid particulates such as dust, mold, bacteria, and other pollutants from the air flowing through the HVAC system and around the house. During certain time periods of the year, such as the holiday season, HVAC systems are heavily used to remove the odors and filter the air inside the house. Due to existing HVAC systems having few and scattered air intakes, odors and other pollutants end up accumulating in areas such as the kitchen and the dining room. As a result, the ceilings can be covered in grease and the furniture can absorb the smell. To minimize the issue, fans are commonly placed in these areas so that the air circulates and reduces the accumulation of odors and pollutants in the area. However, most fans end up re-circulating the same air resulting in minimum effectiveness.

An objective of the present invention is to provide a fan blade with an attachable air filter. A fan blade with an attachable air filter is beneficial to help remove odors and pollutants from the air flow inside a home. Another objective of the present invention is to provide a fan blade with an attachable air filter which is easily attachable and removable. A fan blade with an easily attachable and removable air filter is beneficial as fans are usually hard to reach and bothersome to take down and put back on the ceiling. Plus, the ability to easily change the air filter allows the user to regularly maintain a clean air flow. Another objective of the present invention is to provide a fan blade with an attachable air filter which can be installed without tools. A fan blade with an attachable air filter which can be installed without tools is beneficial and convenient to users who lack tools or the experience. Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section.

DETAIL DESCRIPTIONS OF THE INVENTION

All illustrations of the drawings are for the purpose of describing selected versions of the present invention and are not intended to limit the scope of the present invention.

The present invention introduces an apparatus that can be used for air filtering. More specifically, the present invention is a fan blade with a replaceable filter element. The effective design of the present invention allows the user to replace the filter element without the use of tools. Moreover, the need to disassemble a fan is eliminated through the effective design of the present invention.

Figure 8:
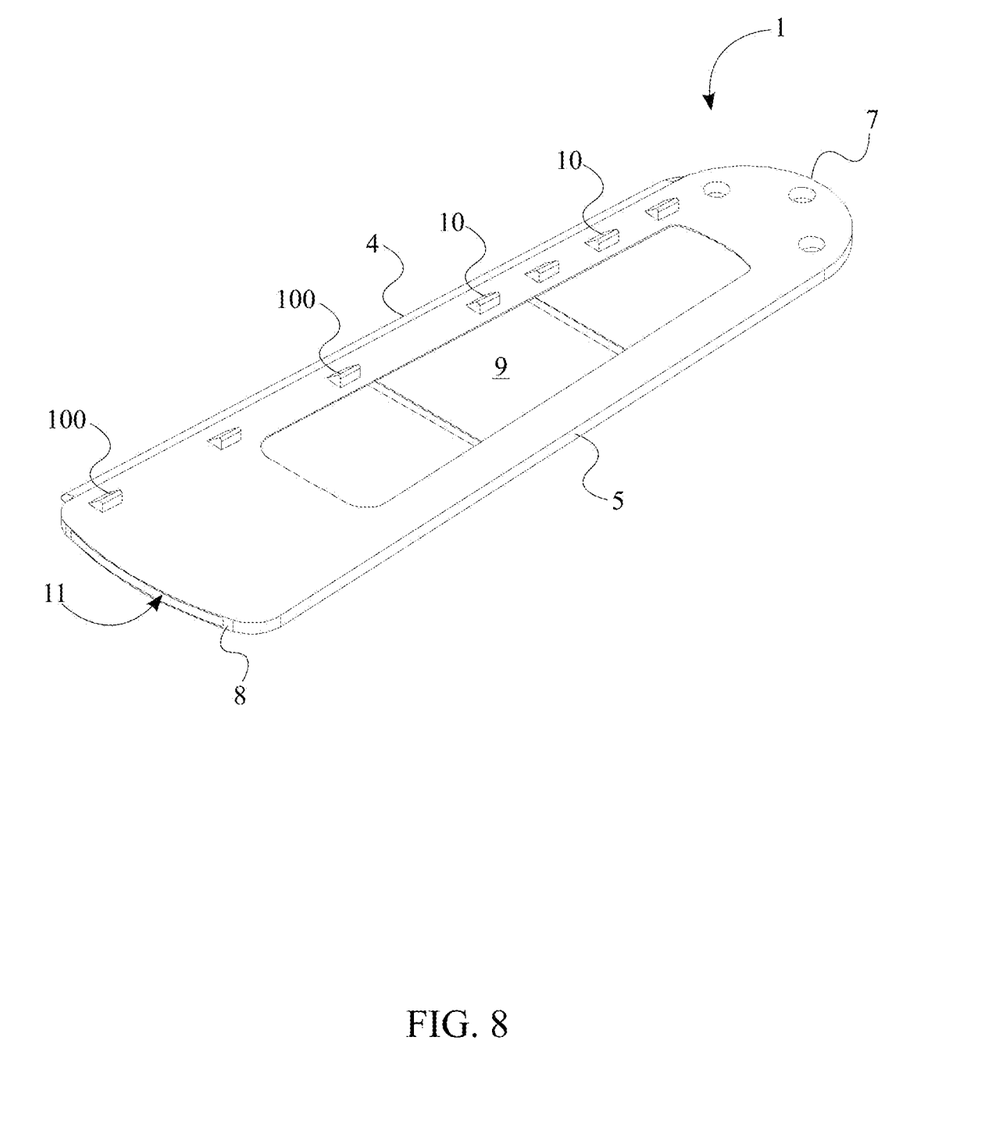
FIG. 8 is a perspective view of another embodiment of the present invention.
Figure 9:
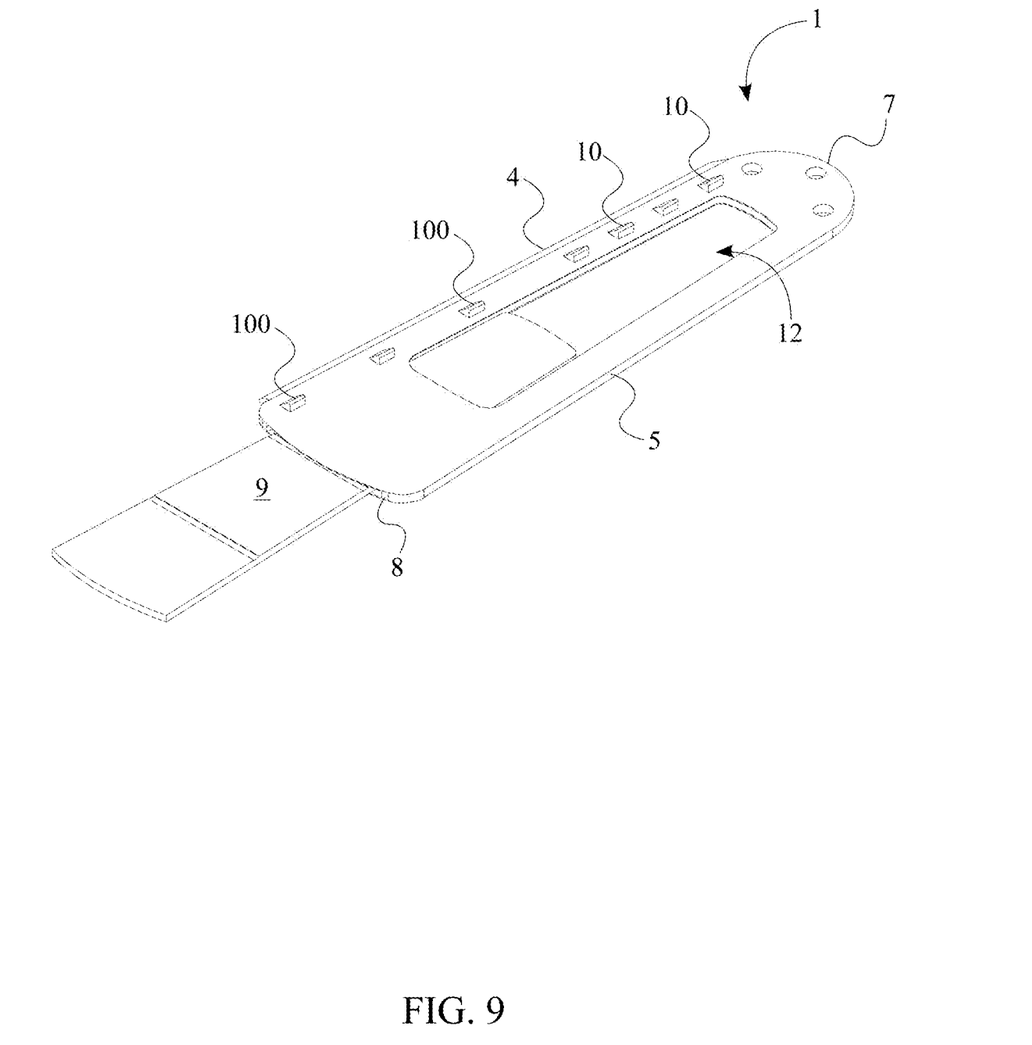
FIG. 9 is a partially exploded perspective view of the other embodiment of the present invention.

As seen in FIGS. 1-5, to fulfill the intended functionalities, the present invention comprises a rotating blade member 1, an air filtering panel 9, a first set of vortex generators 10, a second set of vortex generators 100, and a positioning aperture 12. The rotating blade member 1, which is intended to be a blade of a fan, provides the required rotational movement when the present invention is connected to a power supply. The rotational speed of the rotating blade member 1 can vary in different embodiments of the present invention. As seen in FIG. 8 and FIG. 9, the shape of the rotating blade member 1 can also vary in different embodiments of the present invention. The air filtering panel 9 fulfills the air filtering requirements. To do so, the air filtering panel 9 is removably positioned into the positioning aperture 12 located within the rotating blade member 1. The first set of vortex generators 10 and the second set of vortex generators 100 are used to disrupt the airflow and increase the efficiency of the filtering process.

Figure 1:
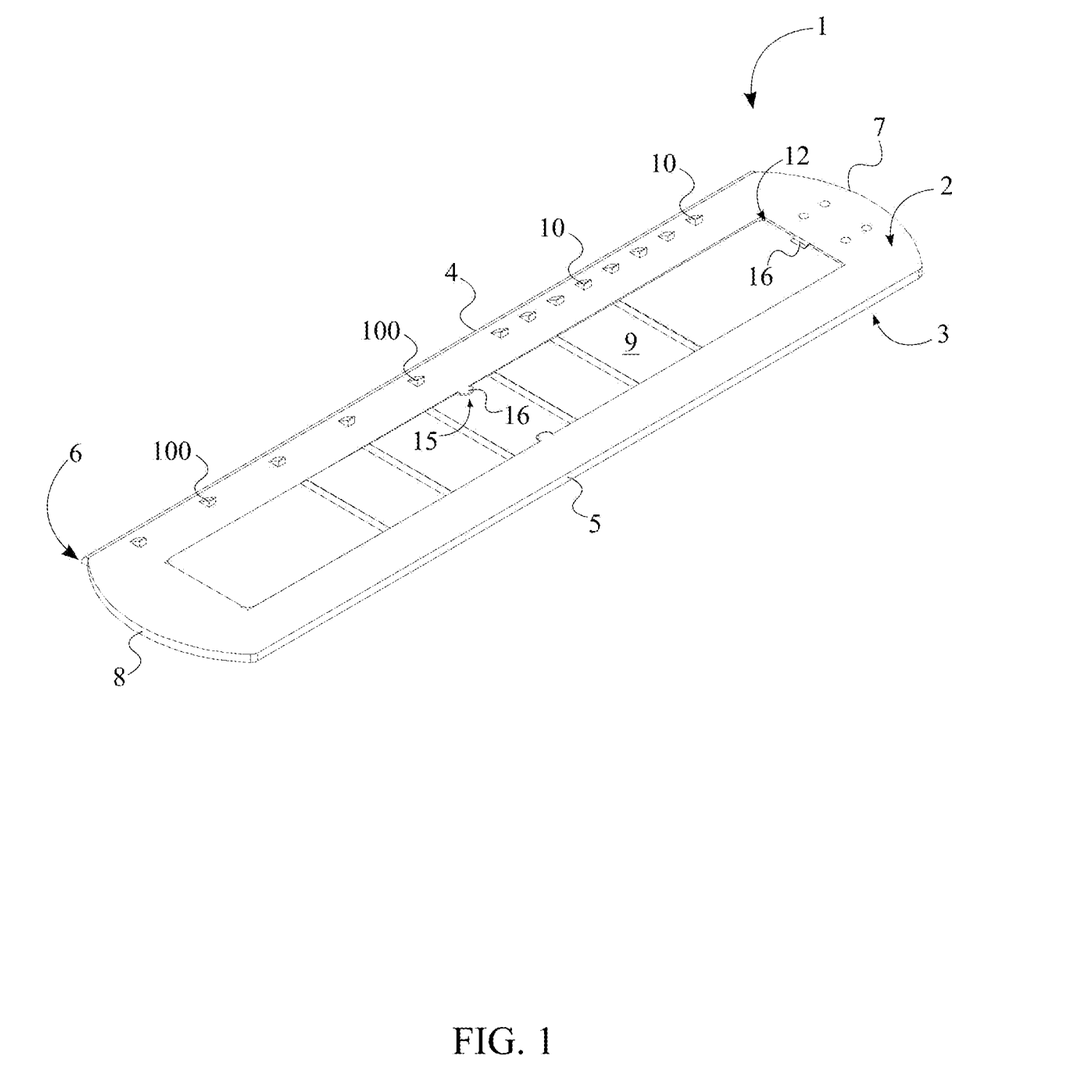
FIG. 1 is a perspective view of the present invention.
Figure 2:
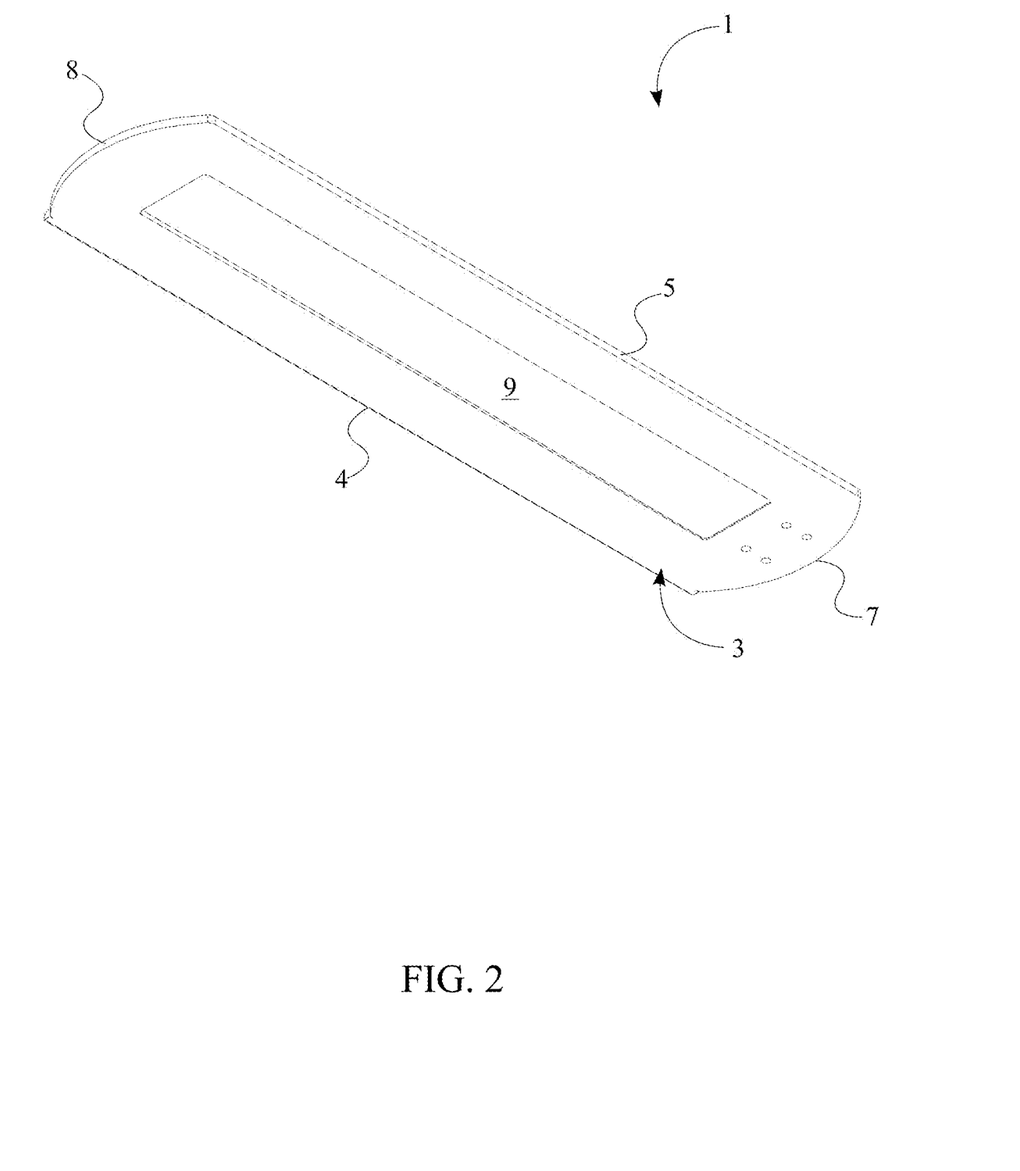
FIG. 2 is a bottom perspective view of the present invention.
Figure 3:
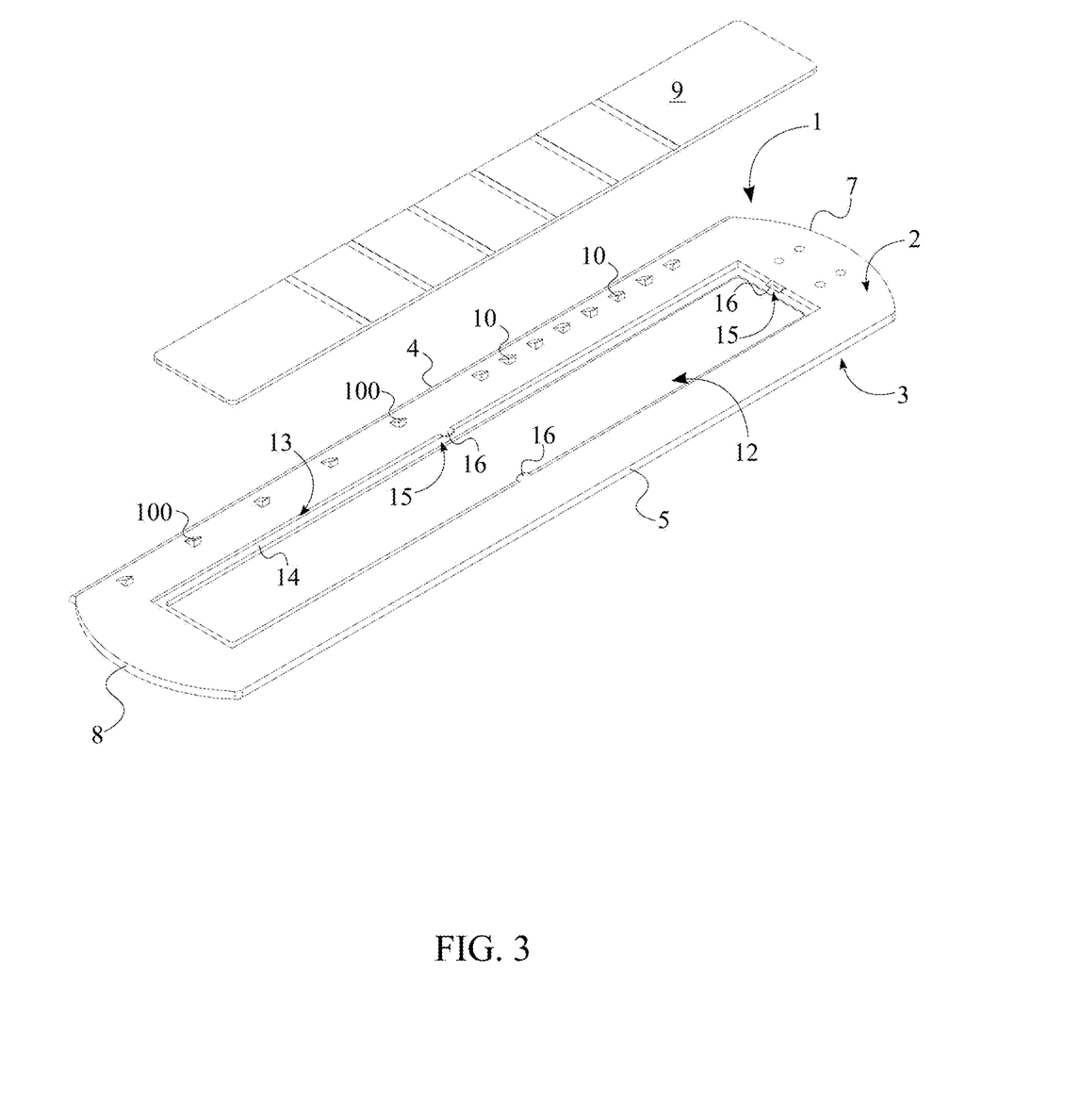
FIG. 3 is an exploded perspective view of the present invention.
Figure 6:
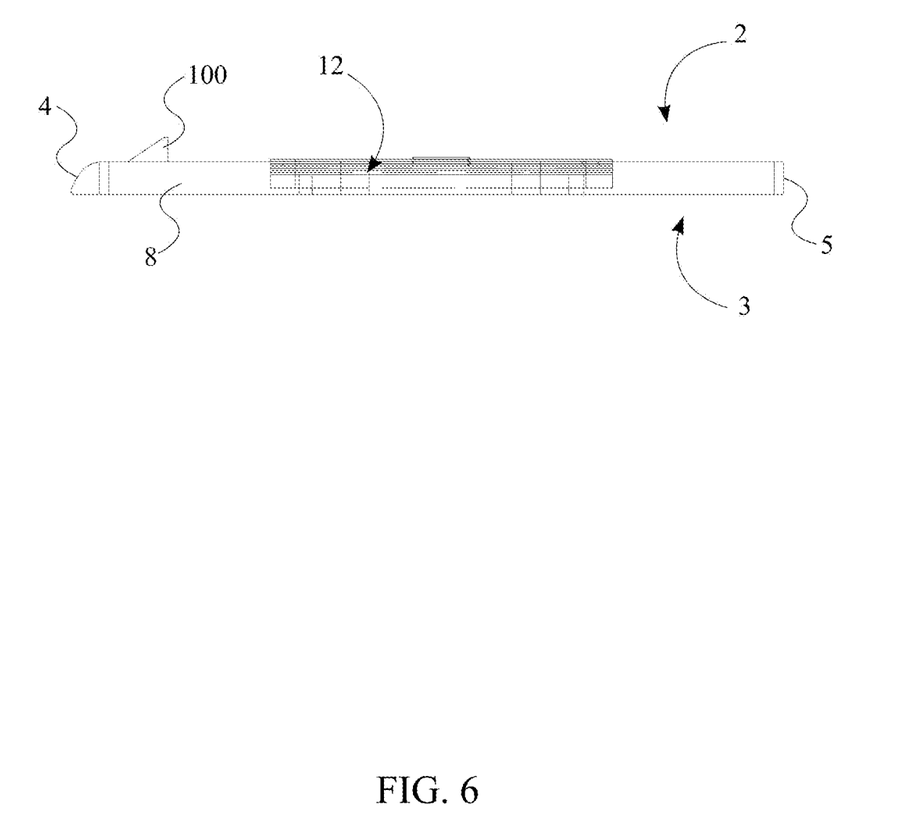
FIG. 6 is a front view of the present invention.

As illustrated in FIGS. 1-3, the rotating blade member 1 comprises a top surface 2, a bottom surface 3, a leading edge 4, a trailing edge 5, a structural body 6, a fixed end 7, and a free end 8. The structural body 6 extends from the fixed end 7 to the free end 8 and determines an overall length of the rotating blade member 1. The length of the rotating blade member 1 can vary in different embodiments of the present invention. The structural body 6 also extends from the leading edge 4 to the trailing edge 5 and determines an overall width of the rotating blade member 1. Similar to the length, the width of the rotating blade member 1 can also vary in different embodiments of the present invention. A distance between the top surface 2 and the bottom surface 3 determines an overall thickness of the rotating blade member 1. Preferably, the leading edge 4 is tapered as seen in FIG. 6. The aerodynamic forces produced from the leading edge 4 results in improved filtering results. In the preferred embodiment, the leading edge 4 is oriented parallel to the trailing edge 5. However, as seen in FIG. 8 and FIG. 9, the overall shape of the structural body 6 can vary in different embodiments of the present invention.

As seen in FIGS. 1-3, the receiving aperture 12 is used to position the air filtering panel 9. To do so, the positioning aperture 12 traverses through both the top surface 2 and the bottom surface 3. To hold the air filtering panel 9 within the structural body 6, the positioning aperture 12 is positioned in between the leading edge 4 and the trailing edge 5, and in between the fixed end 7 and the free end 8.

Figure 10:
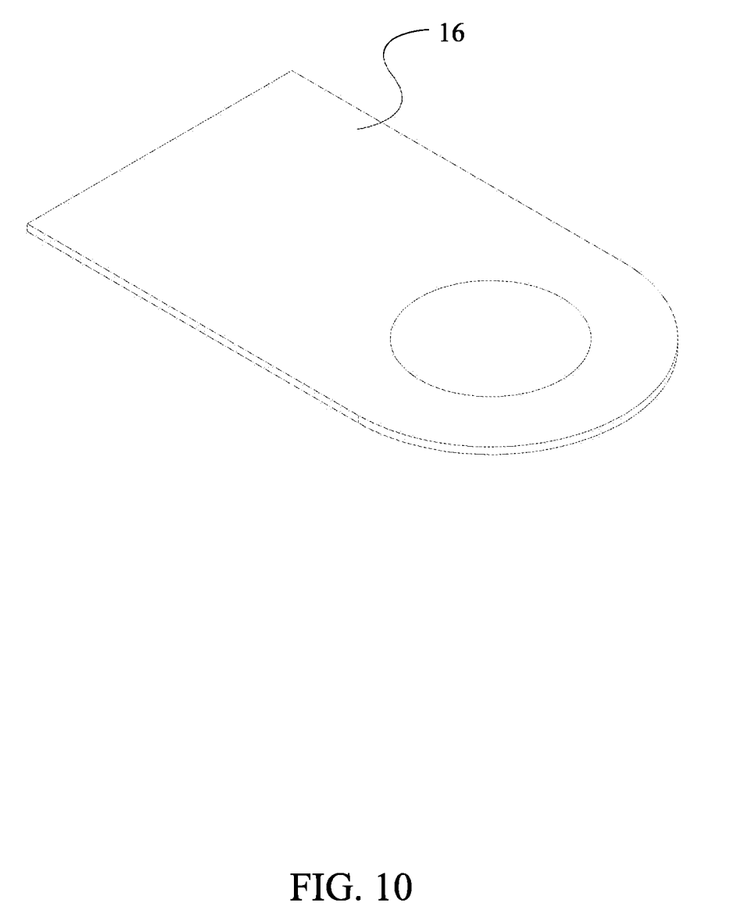
FIG. 10 is a perspective view of one of the plurality of holding clips.
Figure 11:
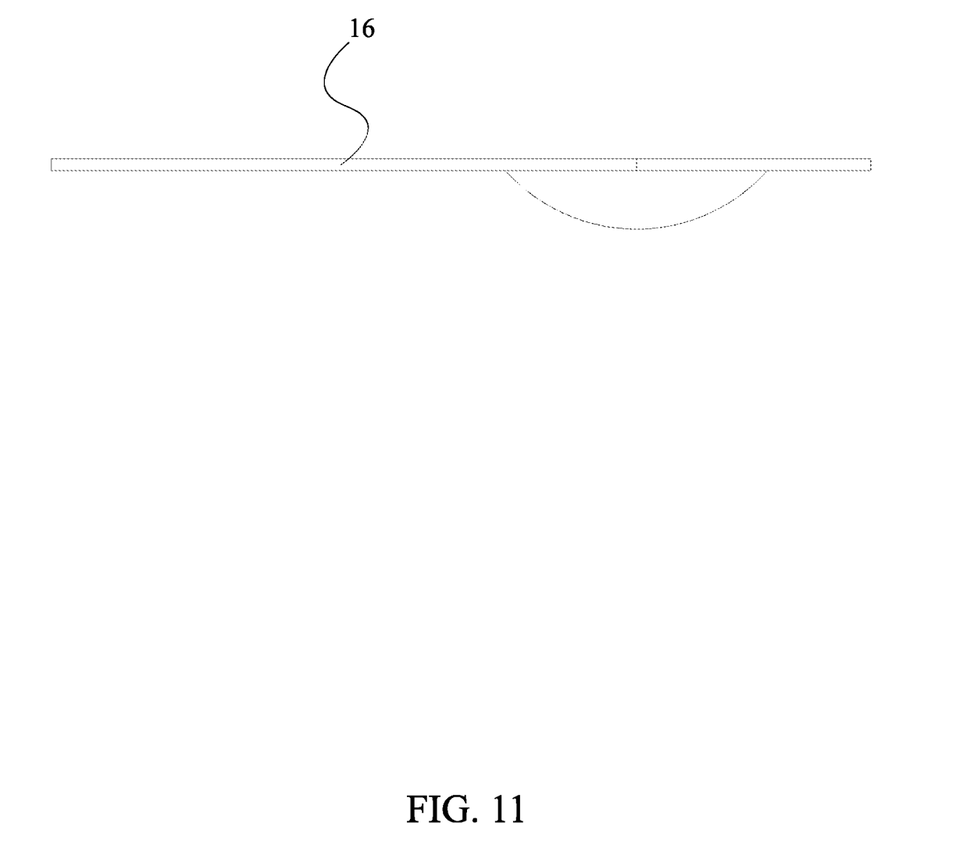
FIG. 11 is a side view of one of the plurality of holding clips.

As shown in FIG. 1, FIG. 10, and FIG. 11, to secure the air filtering panel 9 within the rotating blade member 1, the present invention further comprises an attachment mechanism 15. In the preferred embodiment of the present invention, a plurality of holding clips 16 is used as the attachment mechanism 15. However, other attachment mechanisms can be used in other embodiments of the present invention. The plurality of holding clips 16 is mounted along an inner surface 13 adjacent the top surface 2 with a fiberglass reinforced resin or other comparable material.

As seen in FIG. 3, the present invention further comprises a stoppage lip 14 that is used to hold the air filtering panel 9 within the positioning aperture 12. To do so, the stoppage lip 14 is distributed along an inner surface 13 of the positioning aperture 12 adjacent the bottom surface 3. As a result, the air filtering panel 9 is held in between the plurality of holding clips 16 and the stoppage lip 14. To maintain a secure hold on the air filtering panel 9, the plurality of holding clips 16 is aligned with the stoppage lip 14. Moreover, the presence of the stoppage lip 14 makes a width of the receiving aperture 12 at the bottom surface 3 smaller than a width of the receiving aperture 12 at the top surface 2.

Figure 4:
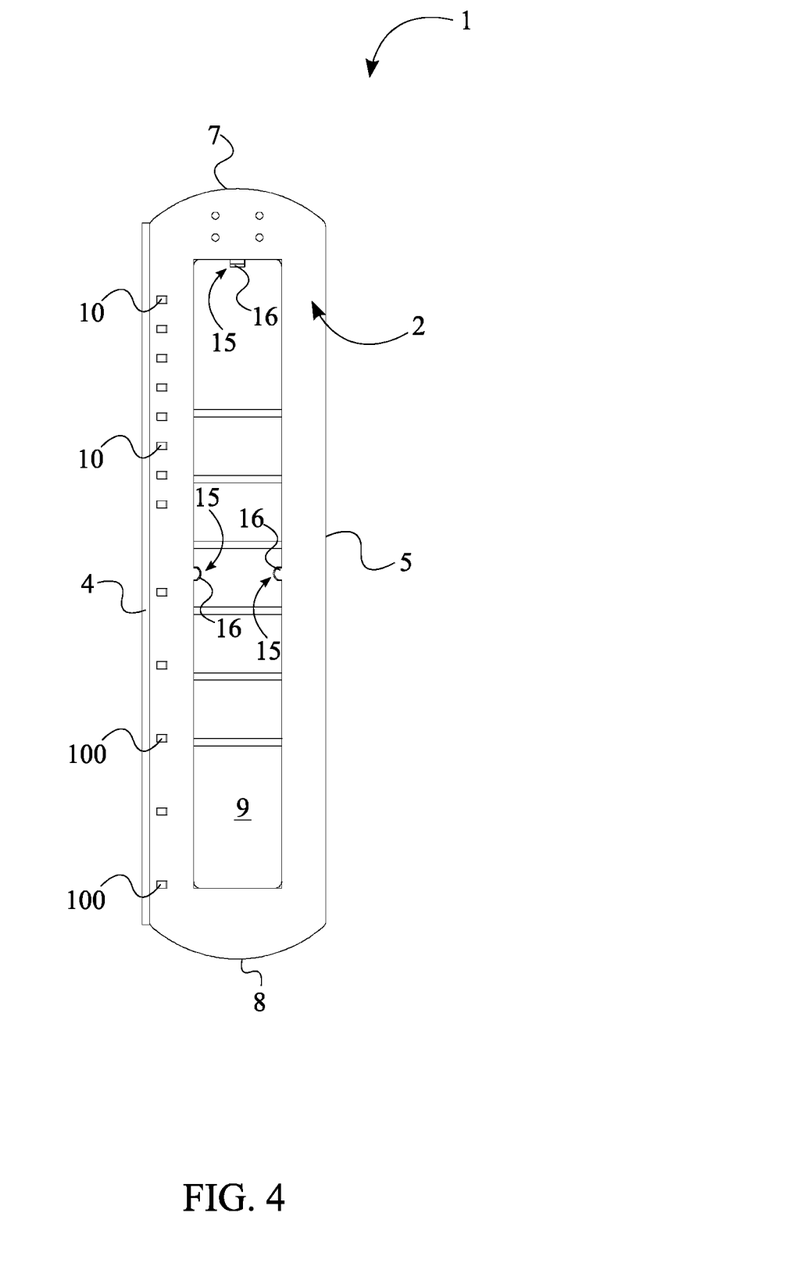
FIG. 4 is a top view of the present invention.
Figure 5:
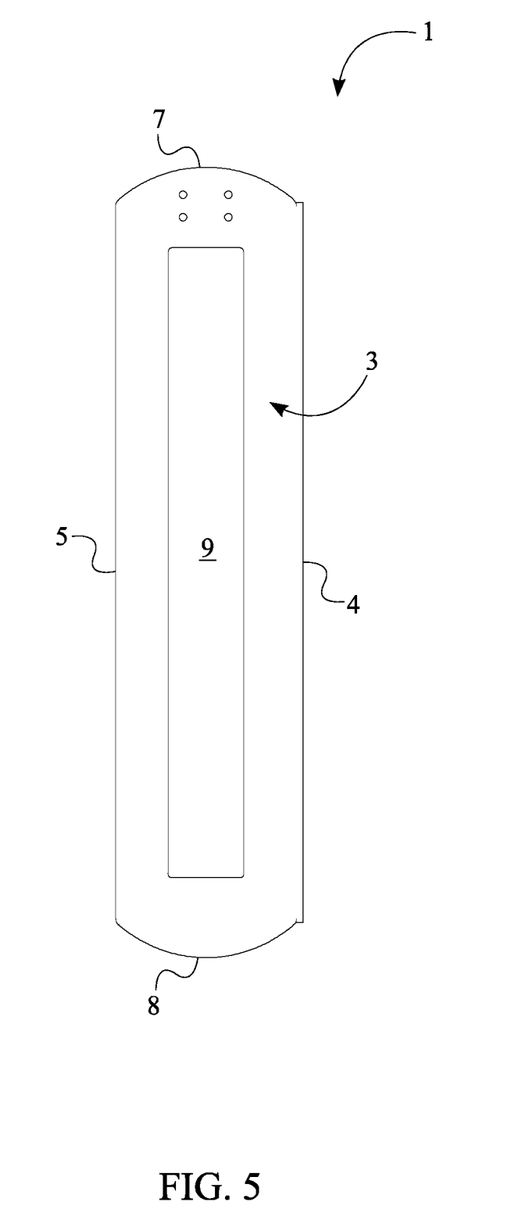
FIG. 5 is a bottom view of the present invention.

As seen in FIG. 1, FIG. 3, and FIG. 4, a plurality of vortex generators is distributed along the leading edge 4. The first set of vortex generators 10 and the second set of vortex generators 100, which are used to increase the efficiency of the filtering process, are mounted onto the top surface 2 and along the leading edge 4. When mounted, the first set of vortex generators 10 is positioned adjacent the second set of vortex generators 100. Moreover, the first set of vortex generators 10 is positioned adjacent the fixed end 7, and the second set of vortex generators 100 is positioned adjacent the free end 8. As further illustrated in FIG. 7, when considering the overall configuration, a distance 300 between each of the second set of vortex generators 100 is greater than a distance 200 between each of the first set of vortex generators 10. The number of vortex generators used in the first set of vortex generators 10 and the second set of vortex generators 100 can vary from one embodiment to another. The size and shape of each of the first set of vortex generators 10 and each of the second set of vortex generators 100 can also vary from one embodiment to another. Furthermore, the angle of orientation for each of the first set of vortex generators 10, and the angle of orientation for each of the second set of vortex generators 100 can also vary from one embodiment to another.

Figure 7:
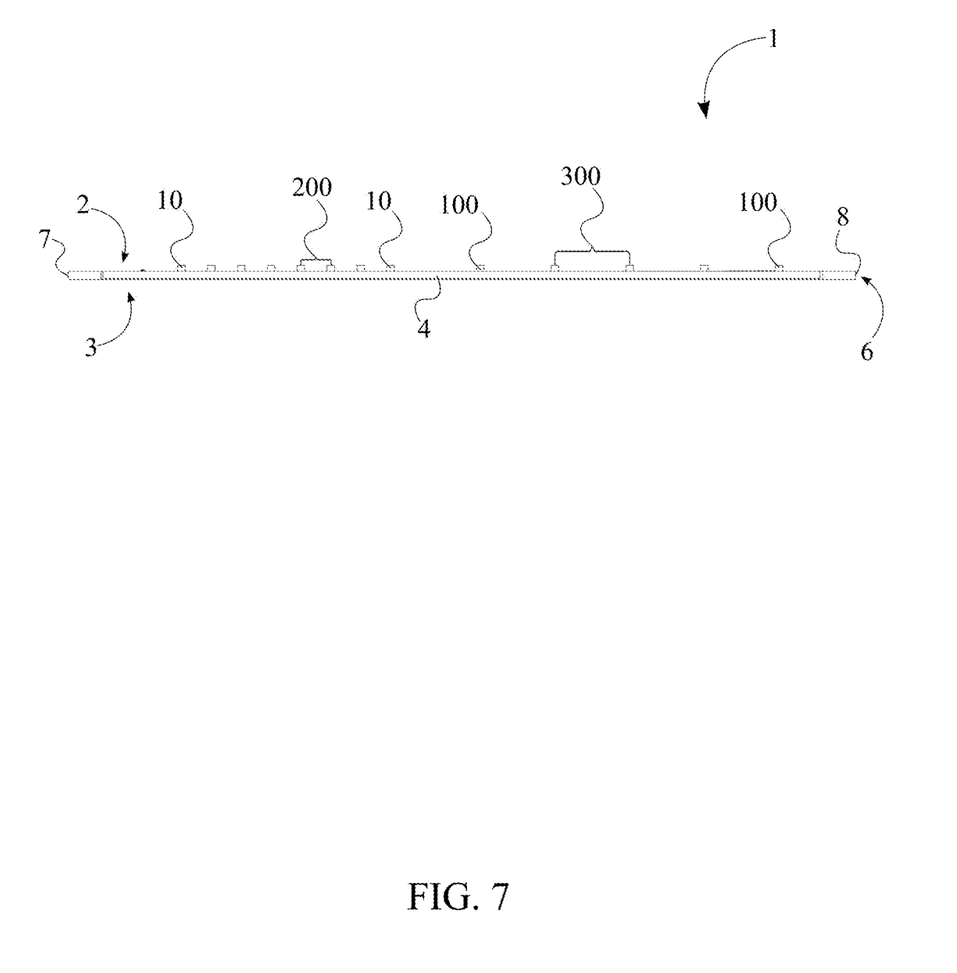
FIG. 7 is a side view of the present invention.

When the rotating blade member 1 is in motion, a slow-moving boundary layer of air is generated along the top surface 2. The boundary layer minimizes the amount of air in contact with the air filtering panel 9. By utilizing the first set of vortex generators 10 and the second set of vortex generators 100, rapidly moving air is drawn towards the top surface 2 so that the amount of air in contact with the air filtering panel 9 is optimized. When the rotating blade member 1 is in motion, the free end 8 rotates at a speed greater than the fixed end 7. To draw the same amount of air towards the top surface 2 as the free end 8, the distance 200 between each of the first set of vortex generators 10 is smaller than the distance 300 between each of the second set of vortex generators 100. By positioning each of the first set of vortex generators 10 closer to each other, rapidly moving air can be drawn to the air filtering panel 9 even at lower speeds. Thus, the overall efficiency of the present invention is improved.

As seen in FIG. 8, in another embodiment, the present invention further comprises a receiving channel 11 that can be used in the process of positioning and removing the air filtering panel 9. To do so, the receiving channel 11 extends into the positioning aperture 12 through the structural body 6. To be easily accessible to the user, the receiving channel 11 traverses into the rotating blade member 1 at the free end 8 in between the top surface 2 and the bottom surface 3. During the attachment process, the air filtering panel 9 is inserted into the receiving channel 11. During the detachment process, the air filtering panel 9 is pulled out from the receiving channel 11. Since the rotating blade member 1 is connected at the fixed end 7, the free end 8 can be easily accessed. Thus, disassembling the fan is not required.

To generate air pressure difference along the top surface 2 and the bottom surface 3, in another embodiment of the present invention, the structural body 6 can be tapered from the leading edge 4 to the trailing edge 5. In such instances, the rotating blade member 1 will have an airfoil shaped cross section. When the rotating blade member 1 is in motion, air travels along the top surface 2 at a high speed and low pressure. In contrast, air travels at a slow speed with comparatively high pressure along the bottom surface 3. The air pressure difference along the top surface 2 and the bottom surface 3 maximizes the air filtering panel 9 exposure. As a result, the overall performance of the present invention is improved.

The overall shape of the air filtering panel 9 is rectangular in the preferred embodiment of the present invention. To correspond with the shape of the air filtering panel 9, the positioning aperture 12 is also rectangular in shape in the preferred embodiment of the present invention. However, the shape of the positioning aperture 12 can vary in other embodiments of the present invention.

When the present invention is in use, the following process flow is generally followed. If the plurality of holding clips 16 is available with the attachment mechanism 15, the air filtering panel 9 positioned in between the plurality of holding clips 16 and the stoppage lip 14. If the receiving channel 11 is available, the air filtering panel 9 is inserted into the receiving channel 11. By executing a pushing motion, the air filtering panel 9 is secured within the positioning aperture 12. When the air filtering panel 9 needs to be replaced or removed, the air filtering panel 9 is pulled out from the receiving channel 11. In another instance, if the receiving channel 11 is not available, the air filtering panel 9 is removed from the positioning aperture 12.

Although the invention has been explained in relation to its preferred embodiment, it is to be understood that many other possible modifications and variations can be made without departing from the spirit and scope of the invention as hereinafter claimed.

What is claimed is:

1. A fan blade with replaceable microparticle filter element comprising:
   a rotating blade member;
   an air filtering panel;
   a first set of vortex generators;
   a second set of vortex generators;
   an attachment mechanism;
   the rotating blade member comprising a positioning aperture, an inner surface, a stoppage lip, a top surface, a bottom surface, a leading edge, a trailing edge, a structural body, a fixed end and a free end;
   the structural body extending from the fixed end to the free end;
   the structural body extending from the leading edge to the trailing edge;
   the positioning aperture traversing through the top surface and the bottom surface in between the leading edge and the trailing edge;

the positioning aperture being positioned in between the fixed end and the free end;
the positioning aperture being delineated by the inner surface;
the stoppage lip being distributed along the inner surface;
the stoppage lip being adjacently positioned to the bottom surface;
the first set of vortex generators and the second set of vortex generators being mounted onto the top surface along the leading edge;
the leading edge being tapered from the top surface to the bottom surface;
the first set of vortex generators being adjacently positioned to the fixed end;
the second set of vortex generators being adjacently positioned to the free end;
the first set of vortex generators and the second set of vortex generators each being a protrusion extending from the top surface;
the air filtering panel being removably positioned into the positioning aperture;
the attachment mechanism comprising a plurality of holding clips;
the plurality of holding clips being mounted along the inner surface;
the plurality of holding clips being adjacently positioned to the top surface; and
the plurality of holding clips being aligned with the stoppage lip;
a distance between each of the vortex generators from the second set of vortex generators being greater than a distance between each of the vortex generators from the first set of vortex generators;
the rotating blade member comprising a receiving channel;
the receiving channel traversing into the structural body at the free end in between the top surface and the bottom surface;
the positioning aperture being rectangular in shape; and
the leading edge being oriented parallel to the trailing edge.

* * * * *